US010227055B2

(12) United States Patent
Burger et al.

(10) Patent No.: US 10,227,055 B2
(45) Date of Patent: Mar. 12, 2019

(54) LOCKING DEVICE FOR AN AXLE

(71) Applicant: MACK RIDES GMBH & CO. KG, Waldkirch (DE)

(72) Inventors: Gunter Burger, Waldkirch (DE); Frank Sornik, Waldkirch (DE); Michael Kraus, Ehren-Kirchen (DE)

(73) Assignee: MACK RIDES GMBH & CO. KG, Waldkirch (DE)

( * ) Notice: Subject to any disclaimer, the term of this patent is extended or adjusted under 35 U.S.C. 154(b) by 274 days.

(21) Appl. No.: 15/110,338

(22) PCT Filed: Mar. 3, 2015

(86) PCT No.: PCT/EP2015/054431
§ 371 (c)(1),
(2) Date: Jul. 7, 2016

(87) PCT Pub. No.: WO2015/132265
PCT Pub. Date: Sep. 11, 2015

(65) Prior Publication Data
US 2016/0325703 A1    Nov. 10, 2016

(30) Foreign Application Priority Data

Mar. 3, 2014  (DE) .................. 10 2014 102 806

(51) Int. Cl.
*F16D 31/02*    (2006.01)
*B60R 21/02*    (2006.01)
(Continued)

(52) U.S. Cl.
CPC .............. *B60R 21/02* (2013.01); *F15B 1/025* (2013.01); *F15B 1/027* (2013.01); *F15B 15/065* (2013.01);
(Continued)

(58) Field of Classification Search
CPC ......... F15B 1/021; F15B 1/025; F15B 15/065
(Continued)

(56) References Cited

U.S. PATENT DOCUMENTS 4,005,877 A  *  2/1977  Humphries ............. B60R 21/02
                                                              280/748
6,640,689 B2 * 11/2003  Mitsui ................... F15B 13/081
                                                              92/136
(Continued)

FOREIGN PATENT DOCUMENTS

DE           40 31 626 C2    4/1991
DE    10 2004 006 788 A1    9/2005
(Continued)

OTHER PUBLICATIONS

Office Action dated Feb. 25, 2015 issued in corresponding in German Application No. 10 2014 102 806.6.
(Continued)

*Primary Examiner* — Michael Leslie
(74) *Attorney, Agent, or Firm* — Nath, Goldberg & Meyer; Jerald L. Meyer

(57) ABSTRACT

A locking device for an axle includes a carrier for an axle, a cylinder for a fluid, having a cylinder wall, and a piston which is located inside the cylinder and is sealed against the cylinder wall at least in sections or at certain points, so that the interior of the cylinder is subdivided into a first volume and a second volume separated from the first volume by the piston, and also comprising a mechanical connection between the piston on one side and the carrier for the axle or the axle itself on the other, so that the position of the piston in the cylinder determines the orientation of the carrier for the axle or the orientation of the axle itself, and
(Continued)

Figure 1:
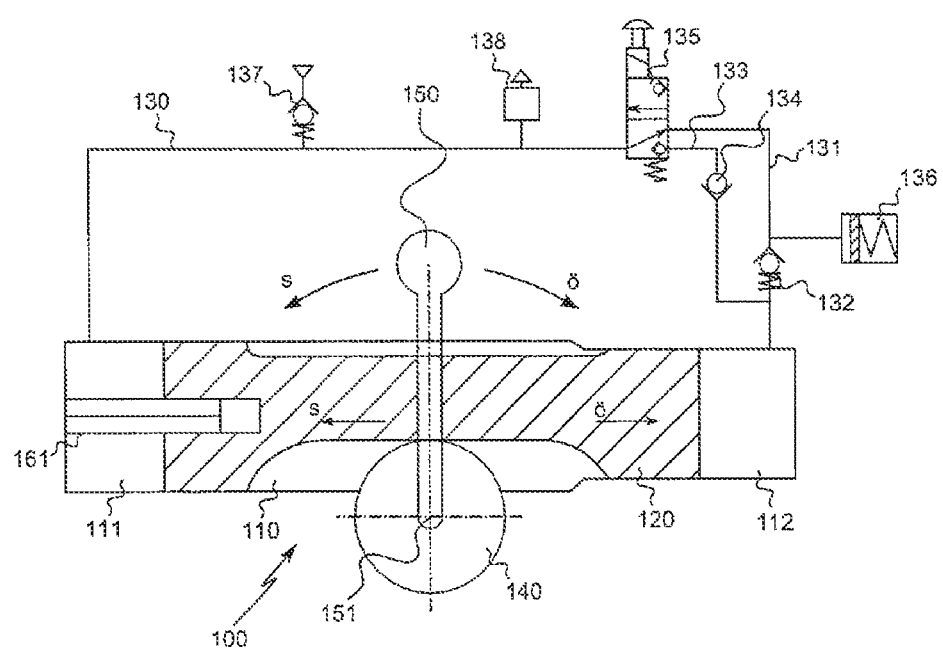

vice versa, wherein the first volume is connected to the second volume via a line system which has a line segment in which a valve is arranged.

12 Claims, 7 Drawing Sheets

(51) Int. Cl.
*F15B 15/06* (2006.01)
*F15B 1/02* (2006.01)
*F15B 1/027* (2006.01)
*F15B 15/14* (2006.01)
*B60R 21/00* (2006.01)

(52) U.S. Cl.
CPC ...... *F15B 15/14* (2013.01); *B60R 2021/0097* (2013.01)

(58) Field of Classification Search
USPC .............................................. 60/414; 92/136
See application file for complete search history.

(56) References Cited

U.S. PATENT DOCUMENTS 6,978,609 B2 * 12/2005 Busch .................... E05F 3/223
60/460
2004/0182234 A1 9/2004 Busch

FOREIGN PATENT DOCUMENTS

| EP | 0 911 224 A1 | 4/1999 |
|---|---|---|
| JP | 58-055165 A | 4/1983 |
| JP | 58-183333 A | 10/1983 |
| JP | 03-007505 U | 1/1991 |
| JP | 2003-065302 A | 3/2003 |
| JP | 2009-204052 A | 9/2009 |

OTHER PUBLICATIONS

International Search Report dated Jun. 2, 2015 issued in corresponding International Application No. PCT/EP2015/054431.
Japanese Office Action dated Dec. 11, 2018, for parallel pending JP patent application No. 2016-555534, with English translation.

* cited by examiner

LOCKING DEVICE FOR AN AXLE

This is a National phase Application filed under 35 U.S.C. 371 as a national stage of PCT/EP2015/054431, filed Mar. 3, 2015, an application claiming the benefit of German Application No. 10 2014 102 806.6, filed Mar. 3, 2014, the content of each of which is hereby incorporated by reference in its entirety.

Locking devices for axles, with which the rotation of the axle can be prevented in one direction so that at most the axle can still rotate in the opposite direction, have great importance for a variety of applications. In the following, reference will be made by way of example to the use thereof to ensure the safety of persons on rides, in particular rides at amusement parks, fairgrounds and carnivals, in which, for example, a safety bar is folded down against the body of a rider to prevent the rider from falling out.

This application is particularly challenging because, while it is essential to prevent personal injury caused by a person falling out of the ride, a safety constraint that is too tight and exerts too much pressure on the person can be exceedingly uncomfortable and may even hazardous since strong forces are regularly exerted during the ride which can intensify by many times the pressure already being exerted on the rider at rest. This specific application with its uniquely challenging requirements should not, however, be construed as limiting the applicability of the locking device according to the invention as described below, which may also be advantageously used in other contexts.

Perhaps the simplest locking device of this type for an axle is a gearwheel which has asymmetric teeth with one gently ascending and one steeply descending flank, into which a pawl engages. This allows an axle coupled to the gearwheel to rotate in the direction in which rotation moves the pawl up the gently ascending flank, while movement in the opposite direction is blocked. In the specific application for locking a safety bar, the rider would thus pull the safety bar, which is connected directly or indirectly to the gearwheel, toward himself until the desired position is reached. As the safety bar is being pulled toward the rider, the pawl slides over the gently ascending flanks and engages in the desired position, where it remains until it is released by a release mechanism—usually at the end of the ride.

However, locking devices of this mechanical design have two serious problems: First, because they have predefined locking positions, they are not steplessly adjustable. Each adjusted position of the locking device thus represents a compromise between the ideal position of the axle which is locked by the locking device and the available locking positions. Second, they are problematic in terms of safety because the inertia of the pawl may allow a sudden change in the direction of movement starting from a position on a tooth crest to loosen the locking device at least to some extent.

One example of a locking device that operates according to this basic principle for use in locking the safety bar on an amusement park ride is known from EP 0 911 224 A1.

As an alternative to such mechanical locking devices, locking devices may be used in which a drive for the safety bar is provided, which is blocked in the safety position. Known in particular are pneumatic or hydraulic drives with which the axle is moved to a predetermined position, in which the drive is then temporarily blocked. However these types of systems, known, for example, from DE 203 14 975 U1, also have two problems: First, for safety-related applications, particularly those relating to the safety of persons, for example in the case of safety bars on rides, it is critical to ensure that even if the drive should malfunction, for example due to a power failure or a leak in the pneumatic or hydraulic circuit, the locking action will be maintained.

Second, the fact that the designated safety position must be predetermined is problematic. This causes problems because under certain circumstances, a locked safety position that is sufficient for a corpulent rider may allow a slim teenager to fall out, while conversely, a designated position that provides adequate safety for a slim teenager may exert too much pressure on the body of a corpulent rider.

The object of the invention is therefore to provide an improved locking device for an axle that will allow the locking position to be determined individually, while at the same time offering a high degree of safety.

This object is attained with a locking device having the features of claim. 1. Advantageous developments of the invention are the subject matter of the dependent claims.

The locking device for an axle according to the invention is equipped with a carrier for an axle or with an axle. In other words, the axle, the movement of which is to be locked in at least one direction of motion by the locking device, may be connected to the locking device via this carrier, particularly in a rotationally fixed manner, if the axle is not actually integrally connected to the locking device, so that each rotation of the axle is accompanied by a rotation of the carrier.

The locking device according to the invention further comprises a cylinder for a fluid, which has a cylinder wall, and a piston located inside the cylinder, which is sealed at least in sections or at certain points against the cylinder wall, so that the interior of the cylinder is subdivided into a first volume and a second volume, which is separated from the first volume by the piston. During operation of the locking device, these volumes, which make up the interior of the cylinder that is not blocked by the piston, are filled with the fluid. Specifically, the cylinder may be a hydraulic cylinder if—as is preferred—the fluid is a liquid, particularly preferably, for example, a hydraulic fluid, whereas if the fluid is a gas, in particular air that is preferably at a pressure of several bar, the cylinder is a pneumatic cylinder.

Further according to the invention, a mechanical connection is provided between the piston on one side and the carrier for the axle or the axle itself on the other, so that the position of the piston in the cylinder determines the orientation of the carrier for the axle or the orientation of the axle itself, and vice versa. As a result of this mechanical connection, any rotation of the axle or the carrier (whereby the orientation of the axle or of the carrier is changed) thus necessarily causes a displacement of the piston in the cylinder, and any displacement of the piston in the cylinder necessarily causes a rotation of the axle or a rotation of the carrier, and thus a change in the orientation of the axle or the carrier.

With this locking device configured according to the invention, the desired locking effect is then achieved in that the first volume is connected to the second volume via a system of lines, which has a line segment in which a valve is arranged.

When the valve is open, which is the preferred state of the valve upon application of a control signal, then the carrier for the axle or the axle is free to rotate because fluid is able to pass from the first volume through the system of lines into the second volume, and vice versa. When the valve is closed, however, rotation of the carrier is blocked because the transport of fluid that is required to enable the displacement of the piston that results from the mechanical connection in order to implement this change in the orientation of the bearing for the axle or in the orientation of the axle itself is prevented by the check valve.

A rider on a roller coaster, for example, can thus steplessly adjust the safety bar to a position that is appropriate for his anatomy while still in the station. The valve is then closed by a local or global cancellation of the control signal, and the safety bar will secure the rider.

The valve is preferably a check valve, in which case the device functions as follows: When fluid, for example, is transported via the system of lines from the first volume into the second volume in the forward direction of the check valve, the carrier for the axle or the axle itself is free to rotate in the direction that leads to a displacement of the piston, which decreases the first volume and increases the second volume because fluid from the first volume is able to pass through the system of lines into the second volume. Rotation in the opposite direction is blocked, however, because the transport of fluid, which is necessary to enable the displacement of the piston that results from the mechanical connection in order to implement this change in the orientation of the bearing for the axle or in the orientation of the axle itself is prevented by the check valve.

The locking device thus configured therefore enables a substantially continuous adjustment of the axle or of the carrier for the axle opposite the locking direction, while at the same time, the locking effect is achieved by means that will fail only if there is a leak in the line system.

When used in the safety bar of an amusement park ride, this locking device thus allows passengers a continuously variable closure of the safety bar, adapted to the individual anatomy of the rider, which the rider can perform on his own. At the same time, opening of the safety bar is blocked, specifically such that it cannot be overridden by a power failure or by active manipulation by the rider.

In a particularly preferred embodiment of the invention, a line segment that extends parallel to the line segment in which the check valve is located is provided in the line system, along with a valve for switching between these line segments. This enables the lock to be unlocked in a simple manner by switching the valve, which can preferably be triggered electrically. When applied to an amusement park ride, for example, this may be used to unlock the safety bar at the end of the ride. In that case it is preferable for safety reasons for fluid to flow through the check valve when the valve, which may be configured as a two-way valve or a three-way valve, for example, is in the unswitched state.

In addition, in principle a check valve that blocks in the opposite direction of flow may also be provided in the parallel line segment. This allows the locking direction to be reversed by switching the valve, thereby switching between the line segments.

In a further advantageous development of the invention, a pressure accumulator for the fluid is provided—if a check valve is used, preferably upstream of the check valve as viewed in the forward direction of the check valve. This measure serves to ensure that variations in pressure, for example as a result of temperature fluctuations, are avoided and volume compensation is possible.

It is further advantageous for a fill coupling and/or a venting valve to be provided for the fluid in the line system. These measures may be applied separately as individual measures, but are preferably applied cumulatively to ensure in a simple manner that the fluid that is used for operating the cylinder or the locking device will have ideal operating characteristics.

A further advantageous development of the invention provides that restoring means are provided, which are designed to support a movement of the piston in one direction, preferably, if a check valve is used, in the direction that is blocked to a transport of fluid through the check valve. Such means can be mechanically implemented by means of a compression spring, for example. This measure causes the locking device to open automatically when it is released. In the application example of locking the safety bar of an amusement park ride, this means that at the end of the ride, for example, the safety bar is released and opens automatically. The added resistance that this measure creates during closing may also help to prevent the safety bar from accidentally being closed too tightly.

Specifically, the mechanical connection of the locking device may be configured such that the mechanical connection is implemented as a row of teeth (e.g. a toothed rail or toothed rack attached to the piston) provided in the piston (that is to say, introduced, e.g. milled, into the piston) or on the piston, and engaging directly or indirectly with a gearwheel on which the carrier for the axle is arranged or which is formed by a segment of the axle. Indirect engagement in this case means specifically that additional gearwheels may optionally be arranged between the gearwheel and the row of teeth, with or without step-up or reduction. The carrier for the axle may be mounted on the gearwheel, for example by screwing, welding or gluing the carrier to the gearwheel, with the gearwheel being formed by a segment of the axle if said segment has a row of teeth encircling it radially.

A particular advantage of the proposed configuration of the locking device is that it enables a second, independent, redundant securing effect to be realized in the simplest manner. This is particularly important for applications with safety relevance, as is the case with amusement park rides, because even if a leak should develop in a cylinder or a line system, the locking device will continue to function reliably.

This redundancy is achieved by providing a mechanical connection between the carrier for the axle or the axle itself and a second piston, which is disposed in a second cylinder for a fluid having a second cylinder wall, so that the orientation of the carrier for the axle or the orientation of the axle itself determines the position of the second piston in the second cylinder. Here, the second piston disposed in the second cylinder is sealed at least in sections or at certain points against the second cylinder wall, so that the interior of the second cylinder is subdivided into a third volume (of the system as a whole, corresponding to the first volume of the second cylinder) and a fourth volume (of the system as a whole, corresponding to the second volume of the second cylinder), which is separated from the third volume by the second piston, wherein the third volume is connected to the fourth volume via a second line system having a line segment in which a second valve, preferably a second check valve, is arranged. This mechanical connection may be formed in particular by a gearwheel which engages both in a row of teeth arranged on or in the first piston and in a row of teeth arranged on or in the second piston, which is arranged parallel to the first piston, so that a rotational movement of the axle around its axis acting on the gearwheel displaces the first piston in one direction and the second piston in the other direction when the axis of the gearwheel is fixedly arranged in space.

It is a particular advantage in terms of production engineering that both cylinders with their respective line systems can be based on the same modular component, and simply placed in a different, particularly point-symmetrical orientation relative to the axle.

It is particularly preferable for a line segment that extends parallel to the line segment in which the second check valve is arranged to be provided—preferably additionally—in the second line system, and for a second valve for switching between these line segments to be provided. In that case, the first and second valves may be actuated together, although for safety reasons it may be preferable to eschew combined actuation, since in that case if one of the valve control mechanisms should malfunction, inadvertently releasing the locking of one of the cylinders, the second cylinder will continue to maintain the locking action.

For the same reasons as were described in reference to the first cylinder and the line system thereof, it is advantageous for a pressure accumulator as a volume compensator for the fluid to (also) be provided in the second line system, upstream of the second check valve as viewed in the forward direction of the second check valve, and/or it is advantageous for a fill coupling and/or a venting valve for the fluid to be provided in the second line system.

The precision of the locking mechanism can be increased and a play-free locking of the axle can be enabled if a pressure accumulator for the fluid is provided on at least one cylinder, preferably on the first and on the second cylinder.

Figure 2A:
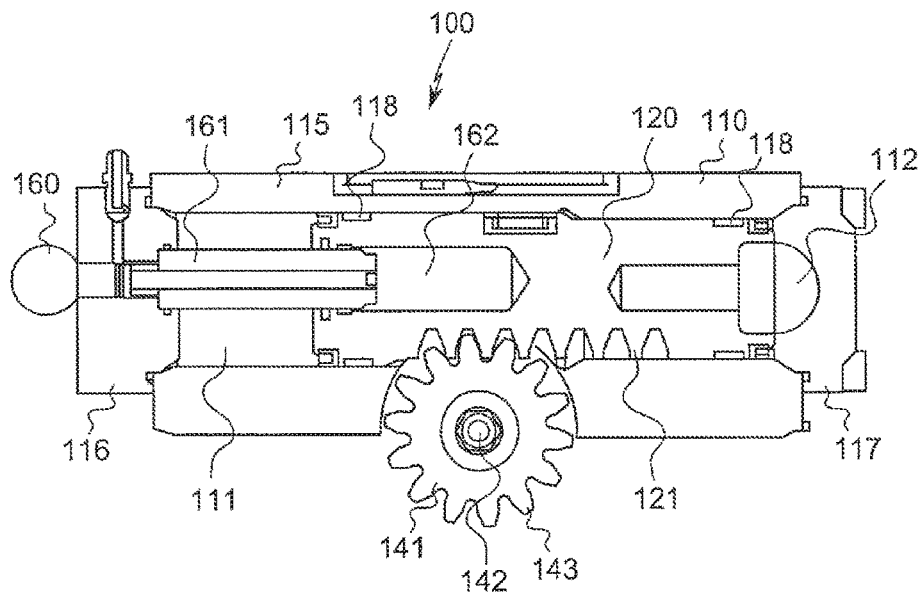
Figure 2B:
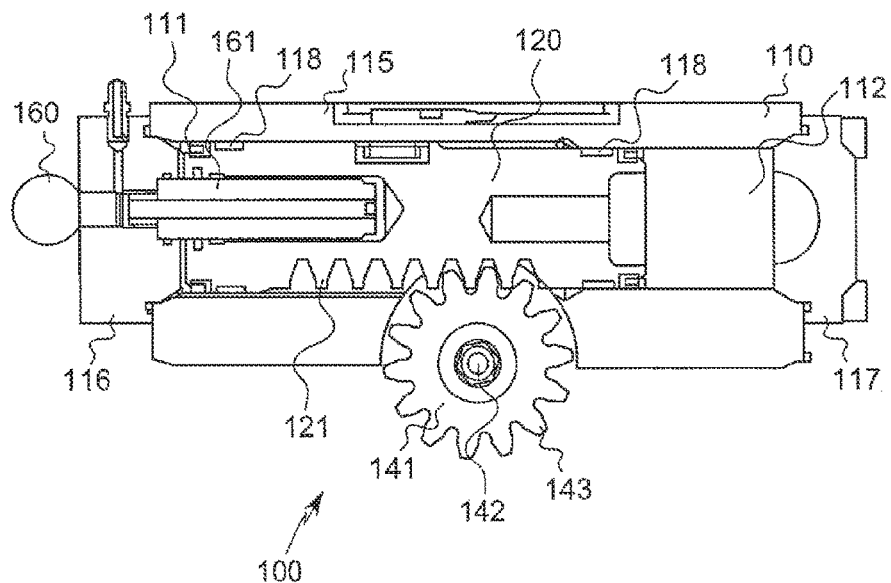
Figure 3:
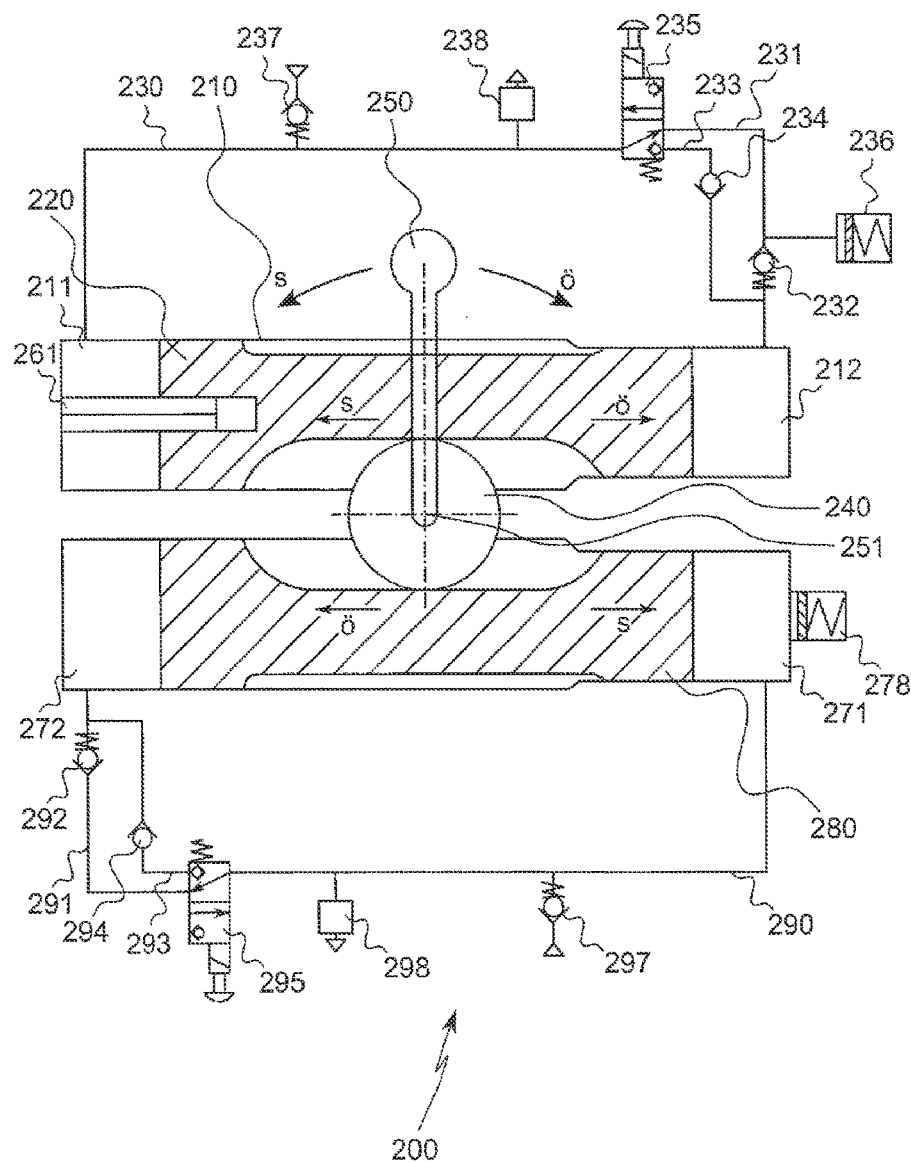
Figure 4A:
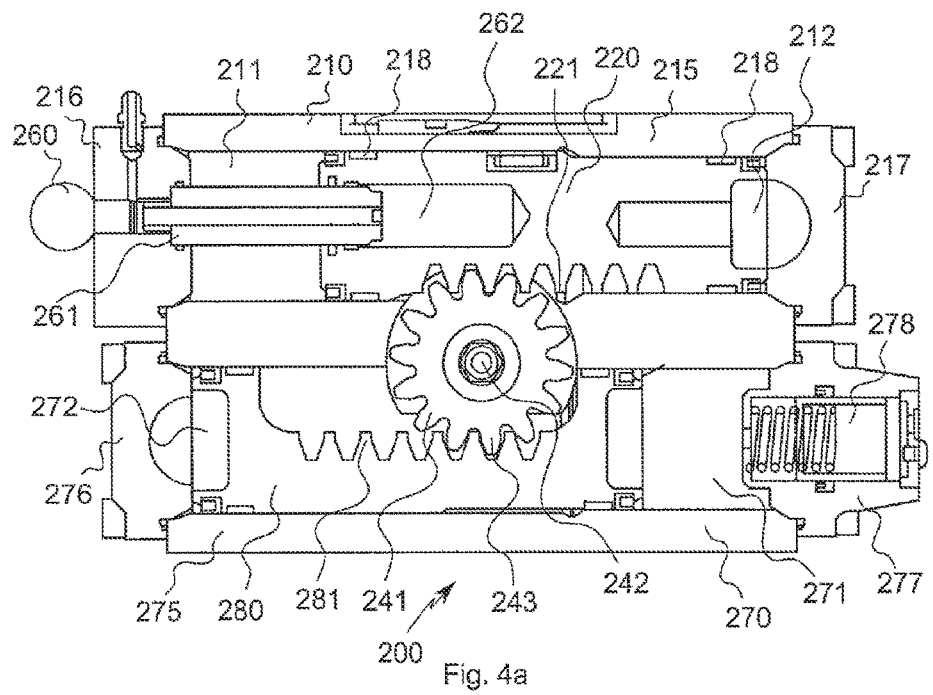
Figure 4B:
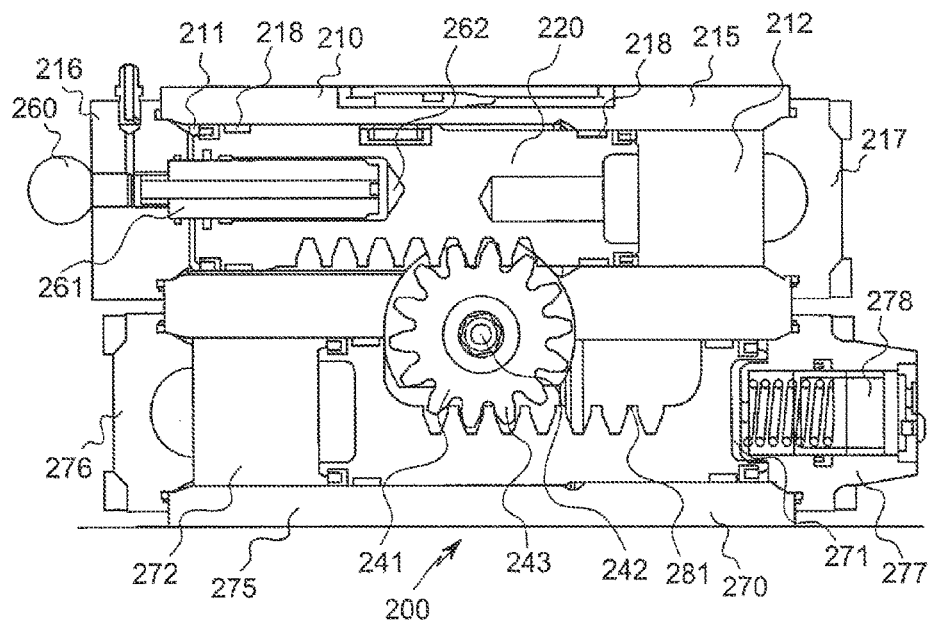
Figure 5:
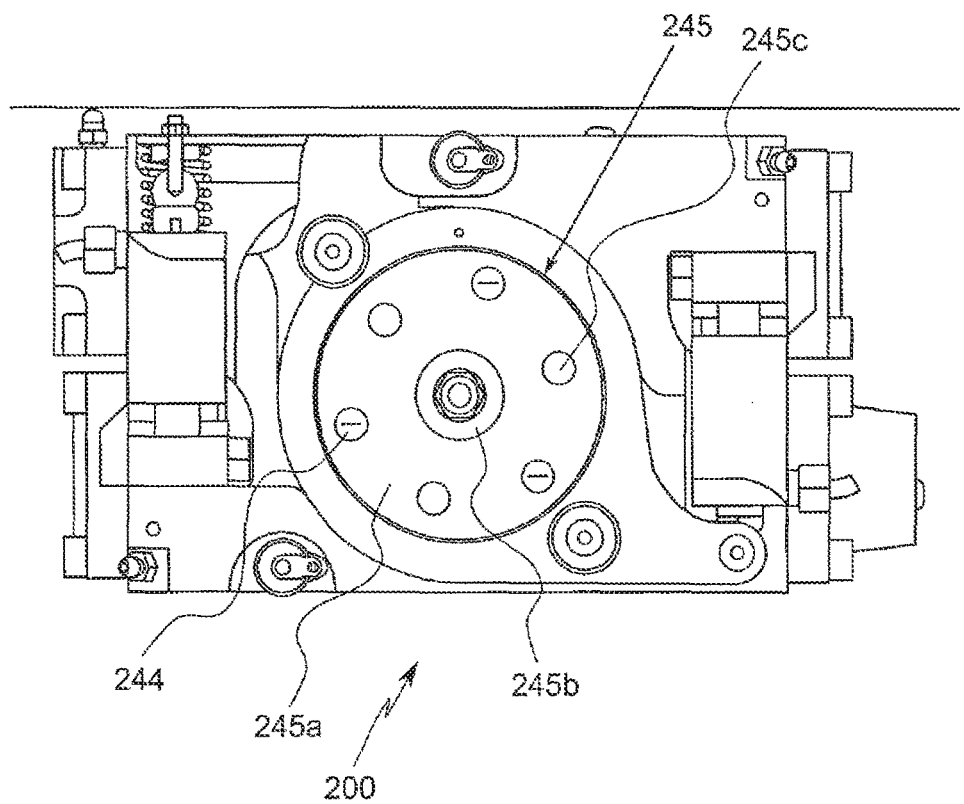
Figure 6:
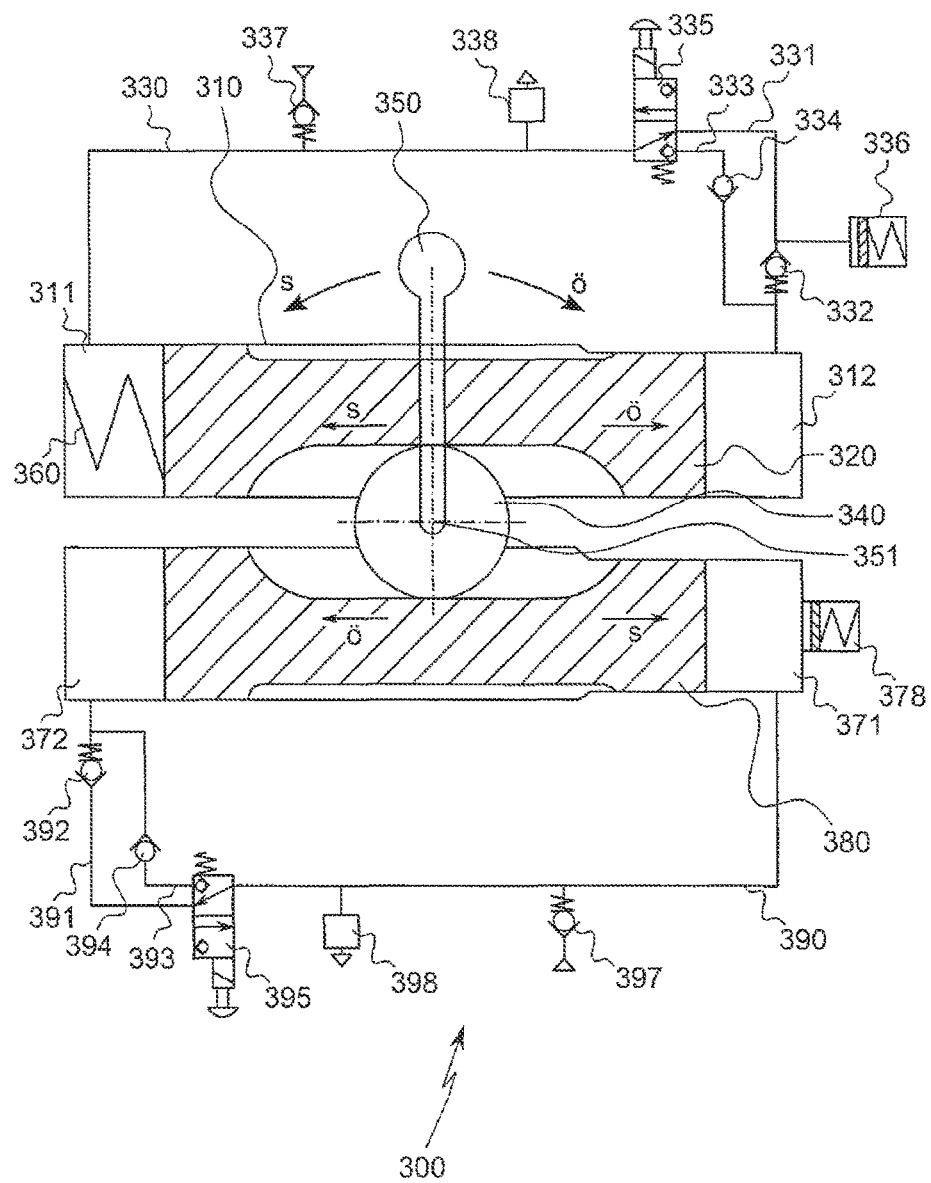
Figure 7:
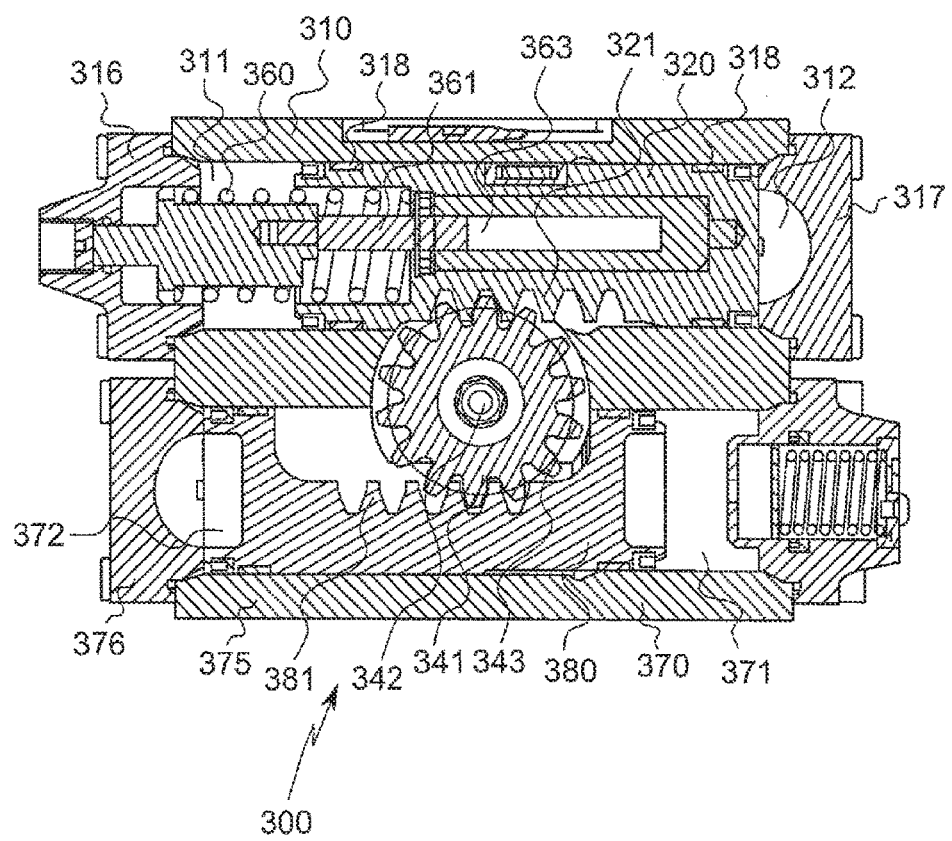

In the following, the invention will be specified in greater detail in reference to figures that illustrate embodiment examples. The drawings show:

FIG. 1: a hydraulic or pneumatic schematic of a first embodiment of a locking device, FIG. 2*a*: the mechanical configuration of the locking device of FIG. 1 in the open state, in cross-section, FIG. 2*b*: the mechanical configuration of the locking device of FIG. 1 in the closed state, in cross-section, FIG. 3 a hydraulic or pneumatic schematic of a second embodiment of a locking device, FIG. 4*a*: the mechanical configuration of the locking device of FIG. 3 in the open state, in cross-section, FIG. 4*b*: the mechanical configuration of the locking device of FIG. 3 in the closed state, in cross-section, FIG. 5: a view of the exterior of the locking device of FIG. 3, FIG. 6: a hydraulic or pneumatic schematic of a third embodiment of a locking device, and FIG. 7: the mechanical configuration of the locking device of FIG. 6 in cross section.

Like components of the similar embodiments are denoted in all of the figures by the same reference signs, unless otherwise indicated.

FIG. 1 shows a hydraulic or pneumatic schematic (these schematics differ in terms of design only with respect to the type and the state of the fluid that is used) of a first embodiment of a locking device 100 with a safety bar 150 arranged thereon, the movement of which around its axle 151 is blocked in opening direction ö (i.e. toward the right in the diagram of FIG. 1) by locking device 100, but is permitted in closing direction s (i.e. toward the left in the diagram of FIG. 1) by locking device 100.

Shown is a cylinder 110, the interior of which is formed by a first volume 111, a second volume 112, and the space occupied by piston 120 inside the cylinder. First volume 111 and second volume 112 are each filled with a fluid, not shown for purposes of clarity, and are connected to one another via a line system 130.

Line system 130 has a line segment 131 in which a valve, embodied for example as check valve 132, is arranged such that check valve 132 permits fluid flowing from first volume 111 through line segment 131 into second volume 112 to pass, and check valve 132 blocks fluid from flowing from second volume 112 through line segment 131 in the direction of first volume 111. A pressure accumulator 136 is provided in line segment 131, upstream of check valve 132 as viewed in the forward direction of check valve 132.

Parallel to line segment 131 an additional line segment 133 is provided, which has a check valve 134 with an inverse forward direction, that is to say, said valve blocks the flow of fluid from first volume 111 into second volume 112 and permits the flow of fluid from second volume 112 into first volume 111.

A valve 135 configured as a two-way valve can be used to determine whether first volume 111 is connected to second volume 112 via line segment 131 or via line segment 133, arranged parallel thereto. Valve 135 is configured such that it will permit the transport of fluid through parallel line segment 133 only if a mechanical or electric switching pulse is present, and will otherwise block this transport.

Also provided in line system 130 are a fill coupling 137 for fluid and—particularly in the case of a hydraulic system—a venting valve 138, to enable optimal operating conditions for the fluid to be provided.

Piston 120 is connected via a mechanical connection 140—illustrated only schematically in FIG. 1—to a section of a safety bar 150 that extends perpendicularly into the drawing of FIG. 1 and represents the (rotational) axle 151 of safety bar 150, wherein the mechanical connection, as will be clarified below in the description of FIGS. 2*a, b* showing the mechanical configuration of locking device 100, is embodied such that the position of piston 120 in cylinder 100 determines the orientation of the carrier for axle 151 or the orientation of axle 151 itself, and vice versa.

When safety bar 150 is moved in closing direction s, mechanical connection 140 causes piston 120 to likewise move in closing direction s, thereby decreasing first volume 111 while at the same time increasing second volume 112. This results accordingly in positive pressure in first volume 111 and negative pressure in second volume 112, which must be equalized by a flow of fluid.

Fluid is thus forced out of first volume 111 into line system 130. At valve 135, the fluid enters line segment 131, reaches check valve 132 in the forward direction, and is able to flow into second volume 112 and equalize the pressure.

However, when safety bar 150 is moved in opening direction ö, mechanical connection 140 causes piston 120 to likewise move in opening direction ö, thereby increasing first volume 111 while at the same time decreasing second volume 112. This results accordingly in a negative pressure in first volume 111 and a positive pressure in second volume 112, which must be equalized by a flow of fluid.

However this flow of fluid is not permitted, because once the fluid that is forced out of second volume 112 into line segment 131 of line system 130 reaches check valve 132 in the blocked direction, its continued flow is prevented. The fluid is also prevented from flowing through parallel line segment 133, because even if fluid were to pass through check valve 134 in the forward direction, valve 135 will block the flow out of parallel line segment 133. As a consequence, pressure equalization is not possible, and safety bar 150 is prevented from moving in opening direction ö. Due to the incompressibility of fluids, this is particularly true when cylinder 110 is a hydraulic cylinder; given the high working pressures in pneumatic cylinders, however, this effect can also be achieved in a pneumatic system.

Locking device 100 can also be unlocked to permit movement of safety bar 150 in opening direction ö. To achieve this, valve 135 receives a switching pulse that switches the valve so as to permit a flow of fluid through the valve into or out of parallel line segment 133, while the flow of fluid through line segment 131 is blocked. As a consequence, when valve 135 is switched to this position, fluid is permitted to flow from second volume 112 into first volume 111 via line system 130, but not from first volume 111 into second volume 112, as in the blocked direction the fluid reaches check valve 134. Accordingly, when valve 135 is switched to this position, safety bar 150 is able to move in opening direction ö, but not in closing direction s.

In the embodiment shown in FIG. 1, the opening movement is supported by a pressure accumulator 160, which is connected to the interior of a bore 162 in piston 120 via a plunger 161 which is inserted into bore 162 in piston 120 when piston 120 is moved in the closing direction. According to this embodiment, with the closing movement of piston 120, fluid is stored under pressure in pressure accumulator 160, and expands when movement in opening direction ö is permitted, thereby supporting the opening of safety bar 150. As was mentioned above, however, other options exist for supporting the opening movement, e.g. a pump or some other energy source that pumps or forces the fluid in, or a mechanical means of influencing the piston, for example a lifting spindle.

Additional details of the configuration of locking device 100 are found in the sectional view of FIGS. 2a and 2b, which show the mechanical components with the exception of safety bar 150—omitting line system 130 with all its parts, in other words the hydraulic or pneumatic components, including the connections to first volume 111 and second volume 112. These diagrams particularly clearly illustrate the configuration of cylinder 110 and the disposition of piston 120 therein, along with the nature and functioning of mechanical connection 140.

Cylinder 110 is composed of a cylinder tube 115 having two end caps 116, 117. Piston 120 is sealed fluid-tight against cylinder tube 115 by means of piston seals 118 arranged near its end faces, and has, on one side, a row of teeth 121 (i.e. a series of teeth arranged in linear succession axially along the piston) extending along its middle section.

Since piston seals 118 prevent any fluid from penetrating into this section, mechanical connection 140 can be implemented by means of a gearwheel 141, the axle 142 of which coincides with axle 151 of safety bar 150, so that the (rotary or folding) movement of safety bar 150 in one direction rotates gearwheel 141 in the same direction, thereby displacing piston 120 as a result of the interaction of teeth 143 of gearwheel 141 with teeth 121 of piston 120. The coincidence of axes 142, 151 can be achieved by a rotationally fixed connection, for example by a carrier for axle 151, arranged on the rotational axis of gearwheel 140, in which axle 151 is arranged in a rotationally fixed connection, in particular fastened. FIGS. 2a and 2b show the positions of piston 120 in cylinder 110 with gearwheel 141 in positions that correspond to a fully open and a fully closed position, respectively, of safety bar 150.

However, if a transmission is provided in place of the single gearwheel 141, the coincidence of axles 141, 151 is not a mandatory condition, and this measure can lead to a change in the rotational directions of safety bar 150 and gearwheel 140 relative to one another.

FIGS. 3 and 4a and b show a second embodiment of a locking device 200, which differs from locking device 100 only in terms of a redundant design. In addition to the structure described above in reference to FIGS. 1 and 2a, b, which is provided in identical form in locking device 200 with the reference signs used to denote the corresponding components in FIGS. 3 and 4a, b being arrived at by adding number one hundred to the reference signs of FIGS. 1, 2a, 2b, in this case mechanical connection 240 to axle 251 is designed such that it also consists of a second piston 280, which is closed off in a second cylinder 270 for a fluid, which has cylinder tube 275 as a second cylinder wall and is closed off at its ends by caps 276, 277, is configured such that the orientation of axle 251 also determines the position of second piston 280 in second cylinder 270. This is achieved in that second piston 280 likewise has a row of teeth 281, into which gearwheel 241 engages.

Second piston 280 disposed in second cylinder 270 is also sealed at least in sections or at certain points against cylinder tube 275 by means of piston seals 288, so that the interior of second cylinder 270 is subdivided into a third volume 271 (corresponding to the first volume of second cylinder 270; it should be noted that the rotational movement of gearwheel 241 displaces second piston 280 in a direction opposite the direction of movement of piston 220) and a fourth volume 272 (corresponding to the second volume of the second cylinder), which is separated from third volume 271 by second piston 280.

Third volume 271 is connected to fourth volume 272 via a second line system 290, which has a line segment 291 in which a check valve 292 is arranged. Parallel to line segment 291 an additional line segment 293 is provided, which has a check valve 294 with an inverse forward direction, that is to say, said valve blocks the flow of fluid from third volume 271 into fourth volume 272 and permits the flow of fluid from fourth volume 272 into third volume 271.

A valve 295 configured as a two-way valve can be used to determine whether third volume 271 is connected to fourth volume 272 via line segment 291 or via line segment 293, arranged parallel thereto. Valve 295 is configured such that it will permit the transport of fluid through parallel line segment 133 only if a mechanical or electric switching pulse is present, and otherwise will block this transport.

Also provided in line system 290 are a fill coupling 297 for fluid and—particularly in the case of a hydraulic system—a venting valve 298, to enable optimal operating conditions for the fluid to be provided.

As is clear from the similar configuration, the hydraulic or pneumatic operation of line system 290 upon displacement of second piston 280 in second cylinder 270 is identical to that of line system 230 upon displacement of piston 220, taking into account the fact that pistons 220, 280 are displaced in different directions by the same movement of gearwheel 241 and that third volume 271 corresponds to first volume 211 and fourth volume 272 corresponds to second volume 212. At the same time, however, this means that the locking effect of each of the two systems can be provided individually, so that even if one system should fail, for example due to a leak in one of line systems 230, 290, safety bar 250 will still be securely locked.

In addition, a pressure accumulator 278 is provided on second cylinder 270, on the side thereof that faces third volume 271, thereby preventing backlash.

In reference to FIG. 5, which shows a view of the exterior of locking device 200, a possible connection to axle 251 via a carrier 245 for axle 251 will be detailed, particularly by way of example. Using such a carrier 245 to secure axle 251 is preferable to an integral connection of the axle to locking device 200 because it enables a modular construction.

Carrier 245 is embodied as a disk 245a mounted on the body of gearwheel 241 by means of screws 244, having a well 245b arranged centrally therein, preferably adapted to the diameter of axle 251, and having threaded bores 245c arranged in disk 245a. A connection is produced by inserting one end portion of axle 251 into well 245b and securing axle 251 therein. The axle may be secured by direct welding, for example, however it is also possible, for example, for a disk to be rotationally fixedly attached to axle 251 and then screw-connected to threaded bores 245c using screws inserted through openings arranged in the disk.

The third embodiment of a locking device 300, shown in FIGS. 6 and 7, has a high degree of similarity to locking device 200, therefore the reference signs used to denote corresponding components in FIGS. 6 and 7 have been arrived at by adding the number one hundred to the reference signs of FIGS. 3, 4a, 4b, and reference may largely be made to the above descriptions of the figures. The difference from locking device 200 is in the configuration of the opening assistance mechanism. In place of pressure accumulator 260 connected via plunger 261 to the interior of bore 262 in piston 220, a compression spring 360 is provided in first volume 311, and is supported against piston 320 and end cap 316 and guided in bore 362 by a guide rod 361.

LIST OF REFERENCE SIGNS 100,200,300 locking device
110,210,310 cylinder
111,211,311 first volume
112,212,312 second volume
115,215,315 cylinder tube
116,216,316 cap
117,217,317 cap
118,218,318 piston seal
120,220,320 piston
121,221,321 row of teeth
130,230,330 line system
131,231,331 line segment
132,232,332 check valve
133,233,333 additional line segment
134,234,334 check valve
135,235,335 valve
136,236,336 pressure accumulator
137,237,337 fill coupling
138,238,338 venting valve
140,240,340 mechanical connection
141,241,341 gearwheel
142,242,342 axle (of the gearwheel)
143,243,343 teeth (of the gearwheel)
150,250,350 safety bar
151,251,351 axle
160,260 pressure accumulator
161,261 plunger
162,262,362 bore
244 screw
245 carrier
245a disk
245b well
245c threaded bore
270,370 second cylinder
271,371 third volume
272,372 fourth volume
275,375 cylinder tube
276,277,376,377 cap
278,378 pressure accumulator
280,380 second piston
281,381 row of teeth
288,388 piston seal
290,390 second line system
291,391 line segment
292,392 check valve
293,393 parallel line segment
294,394 check valve
295,395 valve
296,396 pressure accumulator
297,397 fill coupling
298,398 venting valve
360 compression spring
361 guide rod
ö opening direction
s locking direction

The invention claimed is:

1. A locking device for an axle, comprising:
a carrier for an axle or an axle;
a cylinder for a fluid, which has a cylinder wall;
a piston which is located inside the cylinder and is sealed against the cylinder wall at least in sections or at certain points, wherein the interior of the cylinder is subdivided into a first volume and a second volume, which is separated from the first volume by the piston; and
a mechanical connection between the piston on one side and the carrier for the axle or the axle itself on the other, wherein the position of the piston in the cylinder determines the orientation of the carrier for the axle or the orientation of the axle itself, and vice versa,
wherein the first volume is connected to the second volume via a line system which has a line segment in which a valve is arranged, and
wherein the mechanical connection is further provided between the carrier for the axle or the axle itself and a second piston, which is located inside a second cylinder, having a second cylinder wall, for a fluid, such that the orientation of the carrier for the axle or the orientation of the axle itself determines the position of the second piston in the second cylinder, wherein the second piston located inside the second cylinder is sealed against the second cylinder wall, at least in sections or at certain points, so that the interior of the second cylinder is subdivided into a third volume and a fourth volume, which is separated from the third volume by the second piston, and wherein the third volume is connected to the fourth volume via a second line system, which has a line segment in which a second valve is arranged.

2. The locking device according to claim 1, wherein the valve is a check valve.

3. The locking device according to claim 2, wherein, in the line system, a parallel line segment is provided, extending parallel to the line segment in which the check valve is arranged, and wherein a valve for switching between these line segments is further provided.

4. The locking device according to claim 1, wherein a pressure accumulator is provided as a volume compensator for the fluid in the line system.

5. The locking device according to claim 1, wherein, in the line system, a fill coupling and/or a venting valve are provided for the fluid.

6. The locking device according to claim 1, wherein restoring means are provided, wherein the restoring means support movement of the piston in one direction.

7. The locking device according to claim 1, wherein the mechanical connection comprises a row of teeth provided in the piston or on the piston, said row of teeth engaging directly or indirectly into a gearwheel on which the carrier for the axle is located or which is formed by a portion of the axle.

8. The locking device according to claim 1, wherein the second valve is a check valve.

9. The locking device according to claim 8, wherein, in the second line system, a parallel line segment is provided, extending parallel to the line segment in which the second check valve is located, and wherein a second valve for switching between these line segments is further provided.

10. The locking device according to claim 1, wherein a pressure accumulator is provided on at least one cylinder.

11. A locking device for an axle, comprising:
a carrier for an axle or an axle;
a cylinder for a fluid, which has a cylinder wall;
a piston which is located inside the cylinder and is sealed against the cylinder wall at least in sections or at certain points, wherein the interior of the cylinder is subdivided into a first volume and a second volume, which is separated from the first volume by the piston; and
a mechanical connection between the piston on one side and the carrier for the axle or the axle itself on the other, wherein the position of the piston in the cylinder determines the orientation of the carrier for the axle or the orientation of the axle itself, and vice versa,
wherein the first volume is connected to the second volume via a line system which has a line segment in which a valve is arranged,
wherein the mechanical connection is further provided between the carrier for the axle or the axle itself and a second piston, which is located inside a second cylinder, having a second cylinder wall, for a fluid, such that the orientation of the carrier for the axle or the orientation of the axle itself determines the position of the second piston in the second cylinder, wherein the second piston located inside the second cylinder is sealed against the second cylinder wall, at least in sections or at certain points, so that the interior of the second cylinder is subdivided into a third volume and a fourth volume, which is separated from the third volume by the second piston, and wherein the third volume is connected to the fourth volume via a second line system, which has a line segment in which a second valve is arranged, a pressure accumulator for the fluid being provided in the second line system, and
wherein the mechanical connection comprises a row of teeth provided in the piston or on the piston, said row of teeth engaging directly or indirectly into a gearwheel on which the carrier for the axle is located or which is formed by a portion of the axle.

12. A locking device for an axle, comprising:
a carrier for an axle or an axle;
a cylinder for a fluid, which has a cylinder wall;
a piston which is located inside the cylinder and is sealed against the cylinder wall at least in sections or at certain points, wherein the interior of the cylinder is subdivided into a first volume and a second volume, which is separated from the first volume by the piston; and
a mechanical connection between the piston on one side and the carrier for the axle or the axle itself on the other, wherein the position of the piston in the cylinder determines the orientation of the carrier for the axle or the orientation of the axle itself, and vice versa,
wherein the first volume is connected to the second volume via a line system which has a line segment in which a valve is arranged,
wherein the mechanical connection is further provided between the carrier for the axle or the axle itself and a second piston, which is located inside a second cylinder, having a second cylinder wall, for a fluid, such that the orientation of the carrier for the axle or the orientation of the axle itself determines the position of the second piston in the second cylinder, wherein the second piston located inside the second cylinder is sealed against the second cylinder wall, at least in sections or at certain points, so that the interior of the second cylinder is subdivided into a third volume and a fourth volume, which is separated from the third volume by the second piston, and wherein the third volume is connected to the fourth volume via a second line system, which has a line segment in which a second valve is arranged, wherein, in the second line system, a fill coupling and/or a venting valve are provided for the fluid, and
wherein the mechanical connection comprises a row of teeth provided in the piston or on the piston, said row of teeth engaging directly or indirectly into a gearwheel on which the carrier for the axle is located or which is formed by a portion of the axle.

* * * * *